Dec. 26, 1922.

H. J. BOWER.
THRUST AND RADIAL BALL BEARING.
ORIGINAL FILED FEB. 19, 1919.

1,440,131

WITNESSES

INVENTOR
Harold J. Bower

Dec. 26, 1922.                                                    1,440,131

Witnesses                                       Inventor
Mrs. J. H. Clark.                               Harold J. Bower
Albert J. Evans.

Patented Dec. 26, 1922.

1,440,131

UNITED STATES PATENT OFFICE.

HAROLD J. BOWER, OF NEW YORK, N. Y., ASSIGNOR TO THE HESS-BRIGHT MANUFACTURING COMPANY, OF PHILADELPHIA, PENNSYLVANIA, A CORPORATION OF DELAWARE.

THRUST AND RADIAL BALL BEARING.

Application filed February 19, 1919, Serial No. 278,013. Renewed September 14, 1922. Serial No. 588,291.

*To all whom it may concern:*

Be it known that I, HAROLD J. BOWER, a citizen of the United States, and resident of city of New York, county of Kings, and State of New York, have invented certain new and useful Improvements in a Thrust and Radial Ball Bearing, of which the following is a specification.

The invention relates to an improvement in anti-friction bearings of the type known in the art as "double-row-bearings," that is, bearings having two series of rolling elements between concentric race members and which are designed to transmit radial as well as end thrust loads, in the direction of the axis of the bearings.

The invention contemplates two concentrically mounted race members, an inner and outer member with the two series of roller elements disposed therebetween and is further characterized by the construction of one of the members in two parts and with each part carrying one of the series of roller elements.

One of the objects of the invention is to provide in such a type of anti-friction bearing, an arrangement whereby the parts are made of a relatively small number, are designed to be held accurately, rigidly and securely in their proper relation when in active operation and in which the parts can be readily assembled or demounted when desired.

Broadly, this object is attained by forming one of the two race members in two parts which parts are mounted for relative movement about an axis at right angles to the axis of the bearings with the movable element guided for movement eccentrically relative to the opposed race member to permit the detachment of the movable element from the remaining parts of the bearing.

The invention in its detail construction contemplates the arrangement of the two parts with inter-engaging guiding surfaces which surfaces are parts of a sphere in outline with a radius differing from the radius of the ball races so that when one of the parts is moved over the complementary spherical surface of the other part, the movable part with its roller element is canted from the coacting race member.

Various other objects and advantages of the invention will be in part obvious from an inspection of the accompanying drawings and in part will be more fully set forth in the following particular description of one form of mechanism embodying my invention. The invention also consists in certain new and novel features of construction and combination of parts hereinafter set forth and claimed.

Figure 1:
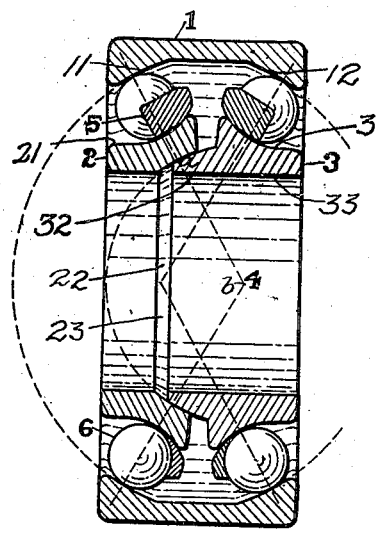
Figure 1 is a longitudinal view taken axially through a preferred embodiment of the invention with the several parts in normal operative position and illustrating a form in which the inner race member is the two part element.

The disclosures in all of the modifications are similar in that there is shown an outer race member and an inner race member with two series of roller elements disposed therebetween. Referring particularly to the disclosure in Figure 1, there is shown an outer race member 1 having the usual form of inclined ball tracks 11 and 12 facing each other and a two-part inner race member with each of the parts 2 and 3 provided respectively with oppositely disposed ball tracks 21 and 31 facing the tracks 11 and 12 with roller elements in the form of balls 6 disposed therebetween. The race member 3 is provided with an annular flange 32 which extends axially from the body portion 33 of the part 3 and projects towards and into the corresponding part 2, to constitute the male element of a universally flexible joint. The contour of the outer side of the flange is a portion of a sphere struck with a radius *a—b* from a point 4 on the axis of rotation of the bearing as the center. The ball tracks 11 and 21 on the outer and inner members are of a radii of curvature arranged so as to conform as much as practicable with the shape of the roller elements. The part 2 of the inner race member is provided on the side facing the flange with a concaved socket 22 having a bearing surface engaging the flange and complementary to the spherical bearing surface thereof. It is therefore understood that the bearing surface 23 of the socket 22 has a radius $a—b$ and is struck from the same center 4.

There is also illustrated a conventional means 5 for maintaining the rotating elements in spaced relation on the tracks as is usual in such constructions.

Figure 3:
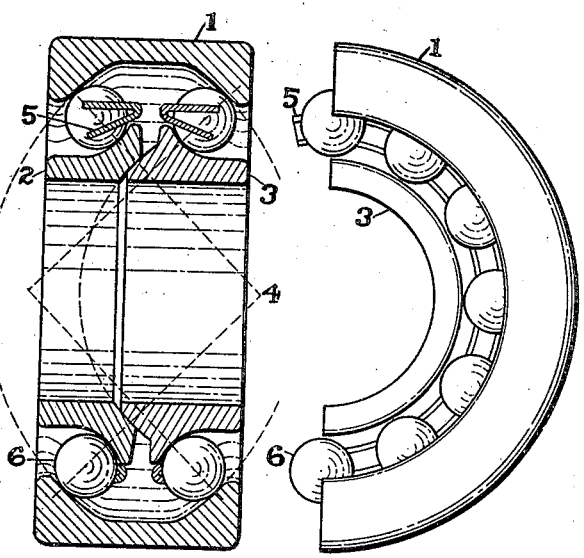
Figure 3 is a view similar to Figure 1 showing a slightly modified form of construction.
Figure 4:
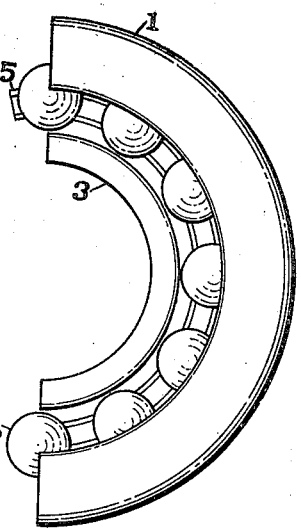
Figures 4 and 5 are each fragmentary views in side elevation respectively of parts of the device shown in Figures 2 and 3.
Figure 5:
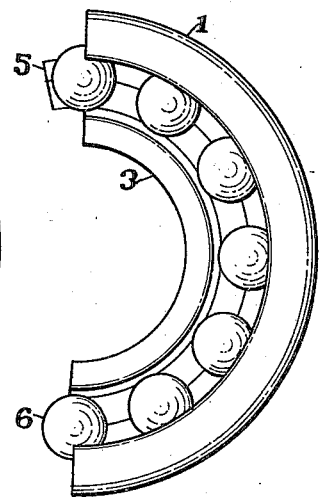

The disclosure in Figure 3 is inserted simply to show the adaptability of the invention to be utilized in connection with roller bearing structures having variable ratios between the angles of thrusts. It will be understood that the showing in Figure 1 provides for approximately 125° longitudinal thrust, while the disclosure in Figure 3 is designed to provide for approximately 90° of longitudinal thrust.

Figures 6, 7:
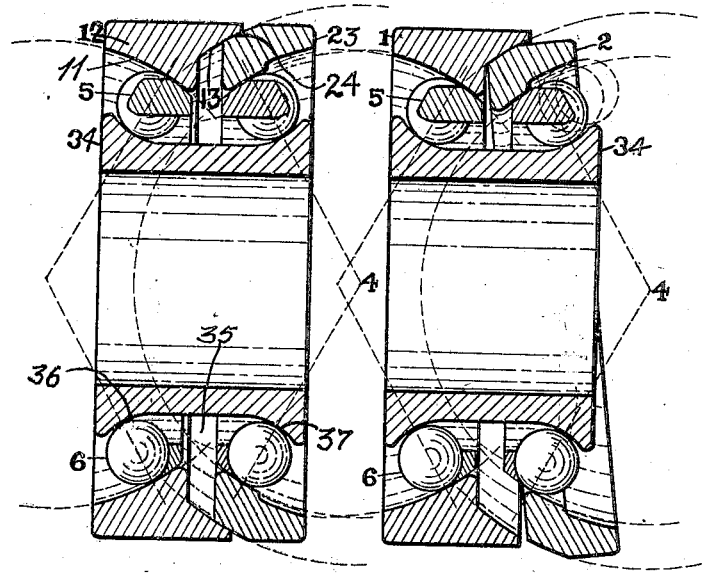
Figure 6 is a view similar to Figure 1 and illustrating a modified form of the invention in which the outer race member is formed in two parts.
Figure 7 is a view similar to Figure 6 showing the partial removal of the demountable part of the outer race member.
Figure 8:
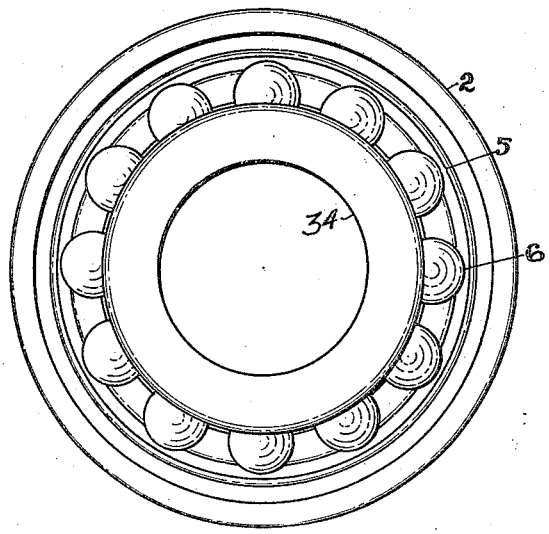
Figure 8 is a view in side elevation of the modified forms shown in Figures 6 and 7.

The modification illustrated in Figure 6 is disclosed to show the adaptability of the invention to an arrangement in which the outer race member rather than the inner race member is formed of the two separable parts. In this disclosure the inner race member 34 is formed in one cylindrical piece of a general spool-shape and is provided with an annular recess 35 on the side thereof, opposite portions of which recess provide roller tracks 36 and 37 facing each other. The outer race member is formed in this case of two parts coacting to form an internal universal joint and including a female member 12 provided on one side thereof with a spherical socket 13. The other part 23 constitutes the coacting male member and is provided with an inter-engaging surface 24 struck from the center 4 on the axis of the bearing, as was described for the inner split member disclosure in Figure 1.

In both forms of the disclosure an effort has been made to feature the simplicity of construction and the minimizing of the number of parts and for this reason the two-part race member has been shown to consist simply and solely of two parts. However, it will be appreciated that under some conditions where economy in manufacture is a factor, that it would be advisable to form the flange as a third part suitably fastened to the body portion rather than in the form of the single casting illustrated.

Figure 2:
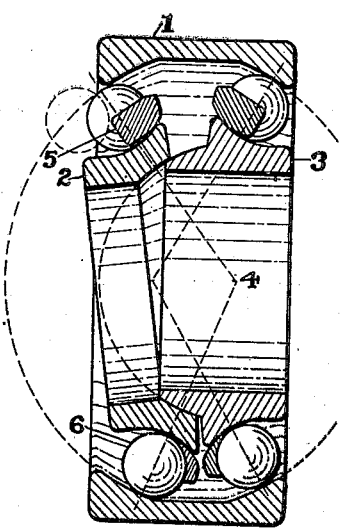
Figure 2 is a view similar to Figure 1 showing the partial removal of one of the parts of the demountable race member.

In operation it will be understood that either one of the parts of the two-part race member can be removed from its coacting part and carry with it the roller elements simply by rotating the movable parts relative to each other and about an axis which passes through the point 4 and perpendicular to the axis of the bearing. In the showing in Figure 2 it will be noted that the part 2 is simply rotated about the part 3 with a sliding bearing and the inter-engaging spherical surfaces and tilted into such a position as will permit the upper side of the part 2 to be withdrawn outwardly and upwardly from the track 11. The demounted parts can then be lifted bodily out away from the other remaining parts.

In the disclosure shown in Figure 7, the outer part 23 is similarly rotated or canted out of its position shown in Figure 6 again rotating the parts about the center defined by the point 4.

It will be understood that by means of a device of the character such as herein disclosed, it is possible, when the two part race member is held in normal position to retain all of the advantages of roller bearings of the type outlined and at the same time to provide such a construction as will readily permit the demounting or the ready assembling of the parts constituting the bearings.

I claim:—

1. In an anti-friction bearing, the combination of an outer race member having a pair of inwardly facing race tracks, an inner race member having diagonally opposed race tracks, roller elements between the said race tracks, one of said race members being substantially integral, and the other of the said race members being in two parts formed with a pivotal connection whereby one of the said parts may tilt upon the other part and relatively to the substantially integral race member to permit the introduction of the roller elements between the race track on the said tilted member and a race track on the substantially integral race member.

2. In an anti-friction bearing, the combination of an outer race member having a pair of inwardly facing race tracks, an inner race member formed of two parts and having diagonally opposed race tracks, roller elements between said race members, the said parts of the inner race member having inner and outer diagonally opposed spherical faces contacting one with the other and having a common center.

3. In an anti-friction bearing, the combination of an outer race member having a pair of inwardly facing spherical roller tracks formed from different centers located upon a common axis, an inner race member formed of two parts having diagonally opposed roller tracks, roller elements between such tracks, the said parts of the inner race member having spherical faces contacting one with the other, and having a common center on the axis of the bearing common with the center of one of the spherical roller tracks upon the outer race member.

4. In an anti-friction bearing, the combination of an outer race member having a pair of inwardly facing spherical roller tracks, an inner race member formed of two parts and having diagonally opposed roller tracks, roller elements between said tracks, the said parts of the inner race member having inner and outer diagonally opposed spherical faces contacting one with the other and having a common center on the axis of the bearing, and being of a different radii of curvature than at least one of the said spherical roller tracks on the outer race member.

5. A ball bearing including an inner and an outer race member, said race members being provided with diagonally opposed tracks, roller elements disposed between the tracks, one of the race members being in two parts, one of said parts having a spherical surface contacting with a diagonally opposed spherical surface of the other part.

6. An anti-friction bearing comprising two rows of roller elements, and inner and outer race members, said race members being provided with diagonally opposed tracks between which the roller elements are mounted, one of the race members being in two parts, one of said parts having a spherical surface contacting with a diagonally opposed spherical surface of the other part, and one of the tracks of the other member being spherical and having approximately a center common with the center of the said spherical surfaces.

7. A ball bearing comprising inner and outer race members and balls therebetween one of the race members being formed of two parts, one of the parts having a spherical surface contacting with the other part, one of said parts having a spherical ball track for the balls, said ball track being on a different radii of curvature about the same center on the axis of the bearing from the radii of contacting spherical surfaces.

8. A ball bearing comprising inner and outer race members, one of the members having ball tracks facing each other and balls between said tracks and diagonally opposed tracks on the other race members, one of the race members being formed of a plurality of separate parts, one of the race members having a spherical ball track projecting from the same center, but on a different radii of curvature than the spherical contact surfaces on the other race members, one of the parts contacting with the other.

9. In a roller bearing, the combination of two concentrically disposed race members, anti-friction rolling elements positioned therebetween, with the elements arranged in two series disposed normally in parallel planes perpendicular to the axis of the bearing, the part of one of the race members carrying one of the rolling elements being separable from the other part of said race member carrying the other set of rolling elements, and rotatable relative thereto about an axis perpendicular to the axis of the bearing and means for guiding the movable part of said race member in its rotatable movement relative to the other part.

10. An anti-friction bearing comprising an inner and an outer race member and two series of interposed rolling elements, one of said members being in two parts with each part engaging one of the series of elements and separable therewith from the other part and its series of elements, and a pivotal mounting for the parts to permit relative rotary movement to demount one of the parts and its series of elements from the other parts of the bearing.

Signed at Bayonne in the county of Hudson and State of New Jersey this fifteenth day of February A. D. 1919.

HAROLD J. BOWER.

Witnesses:
Mrs. J. H. CLARK,
ALBERT J. EVANS.